United States Patent [19]
Robinson

[11] Patent Number: 4,890,768
[45] Date of Patent: Jan. 2, 1990

[54] SELF DRAINING CONTAINER

[75] Inventor: Gerald R. Robinson, Perrysburg, Ohio

[73] Assignee: Owens-Illinois Plastic Products Inc., Toledo, Ohio

[21] Appl. No.: 103,334

[22] Filed: Oct. 1, 1987

[51] Int. Cl.⁴ .............................................. B67D 1/16
[52] U.S. Cl. .................................. 222/109; 222/111; 222/482; 222/572; 215/274
[58] Field of Search ............... 222/109, 111, 482, 484, 222/562, 572; 215/100 R, 320, 325, 335, 274, 276; 220/855 P; 53/490; 425/525

[56] References Cited

U.S. PATENT DOCUMENTS

| | | | |
|---|---|---|---|
| 2,601,039 | 6/1952 | Livingstone | 222/109 |
| 2,793,790 | 5/1957 | Kahler | 222/109 |
| 4,082,827 | 4/1978 | Chlystun | 425/525 X |
| 4,336,891 | 6/1982 | Smith | 215/100 R X |
| 4,550,862 | 11/1985 | Barker et al. | 222/109 |
| 4,566,509 | 1/1986 | Szajna | 215/276 X |
| 4,640,855 | 2/1987 | St. Clair | 222/482 X |

FOREIGN PATENT DOCUMENTS 2137971  10/1984  United Kingdom ................. 53/490

Primary Examiner—Kevin P. Shaver
Assistant Examiner—Gregory L. Huson

[57] ABSTRACT

A self draining container is disclosed. The container has a body and an upper integral pouring spout. The upper part of the container body and the spout define a generally funnel shaped section. A ring member is attached to and surrounds the pouring spout. The ring member and the pouring spout define a flow back chamber. An opening extends between the flow back chamber and the container body. A separable cap is removably mounted over the pouring spout.

9 Claims, 3 Drawing Sheets

SELF DRAINING CONTAINER

BACKGROUND OF THE INVENTION

Self draining containers are known in the art. These containers include means for returning contents which have dripped or run down the exterior of the pouring spout to the main body of the container Examples of prior art self draining closures are shown in U.S. Pat. No. 4,550,862 and U.S. Pat. No. 4,640,855.

Self draining containers, known in the prior art, often have drawbacks. One of the drawbacks is that it is sometimes difficult to completely remove the contents of the container. Often in prior art self draining containers a portion of the contents is trapped when the container is inverted.

Many prior art self draining container assemblies are also quite expensive to produce and assemble. Some of thes prior art containers include several components which must be correctly orientated during assembly.

SUMMARY OF THE INVENTION

The self draining container, according to the present invention, includes only three parts. The pouring spout is integrally blow molded along with the container body.

The present container provides a smooth and generally funnel shaped section between the integral container body and pouring spout wherein essentially the entire contents of the container may be removed through the pouring spout when the container is inverted.

Because the method of making a self draining container, according to the present invention, include the blow molding of the pouring spout along with the blow molding of the container body, the pouring spout is correctly orientated with respect to the body thereby eliminating an expensive manufacturing step sometimes found in prior art self draining container assemblies.

A separable ring member surrounds the pouring spout and is attached adjacent the upper end of the container body. The ring member together with the pouring spout define a flow back chamber. An opening forms a path of communication between the flow back chamber and the container body. A cap is mounted over the pouring spout.

DESCRIPTION OF THE PREFERRED EMBODIMENTS

A self draining container, according to the present invention is generally indicated by reference number 10. While the self draining container 10, depicted in these drawings, is a plastic bottle specifically designed for liquids, other self draining containers which fall within the scope of the present invention may be constructed of other materials and used to contain liquids, powders or granules.

Figure 1:
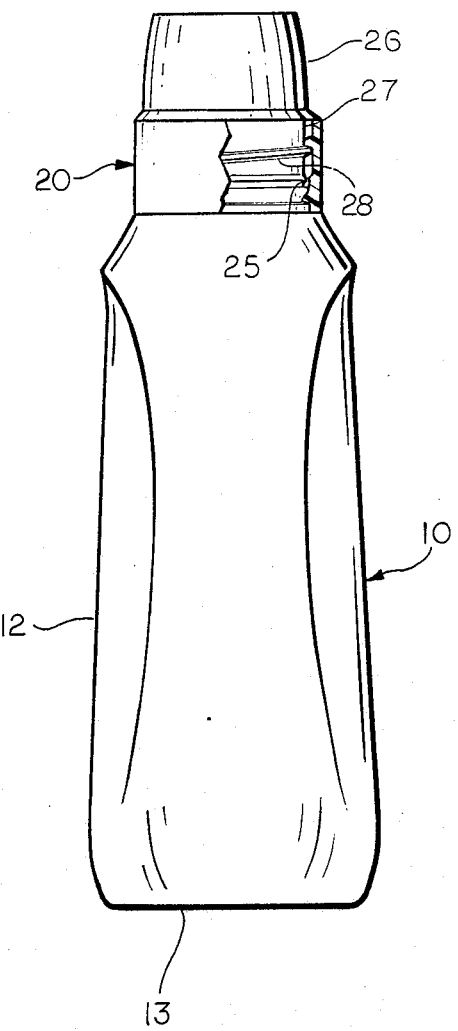
FIG. 1 of is a perspective view of a fully assembled self draining container, according to the present invention with a portion of the cap broken away.
Figure 2:
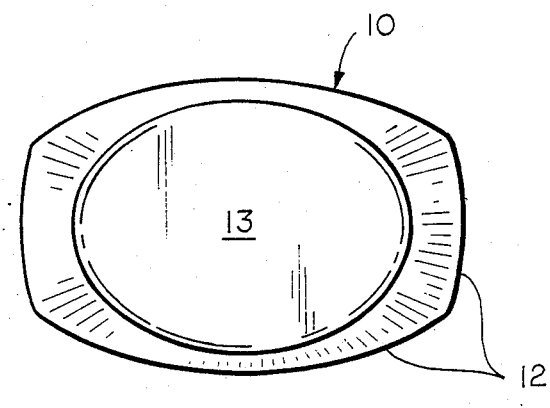
FIG. 2 is a bottom view of the self draining container shown in FIG. 1.
Figure 3:
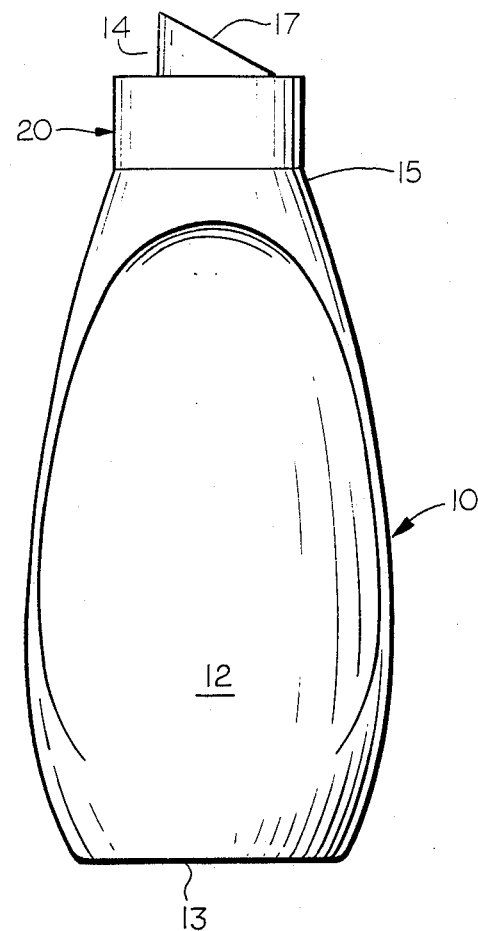
FIG. 3 is a side elevational view of the self draining container shown in FIG. 1 and having the cap removed.
Figure 4:
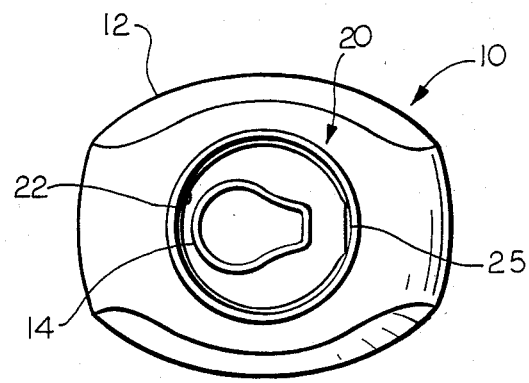
FIG. 4 is a top view of the self draining container as shown in FIG. 3.
Figure 5:
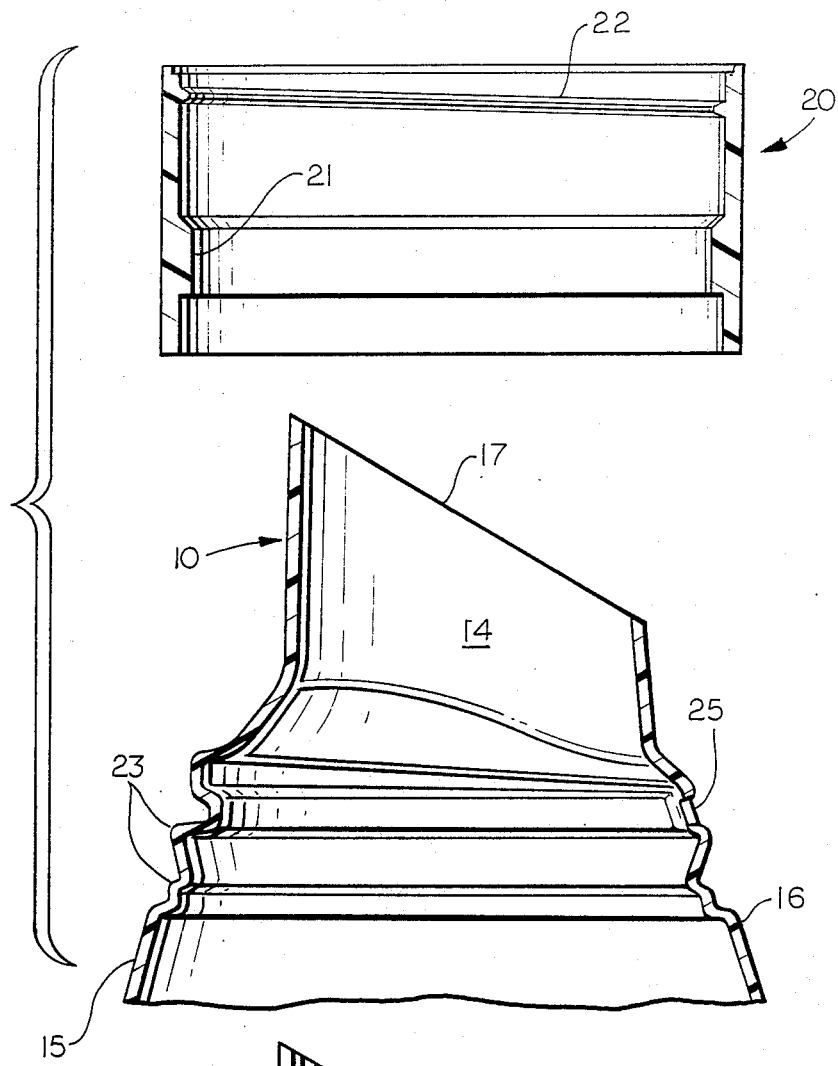
FIG. 5 is a fragmentary exploded view showing the separable ring member in position above the pouring spout.
Figure 6:
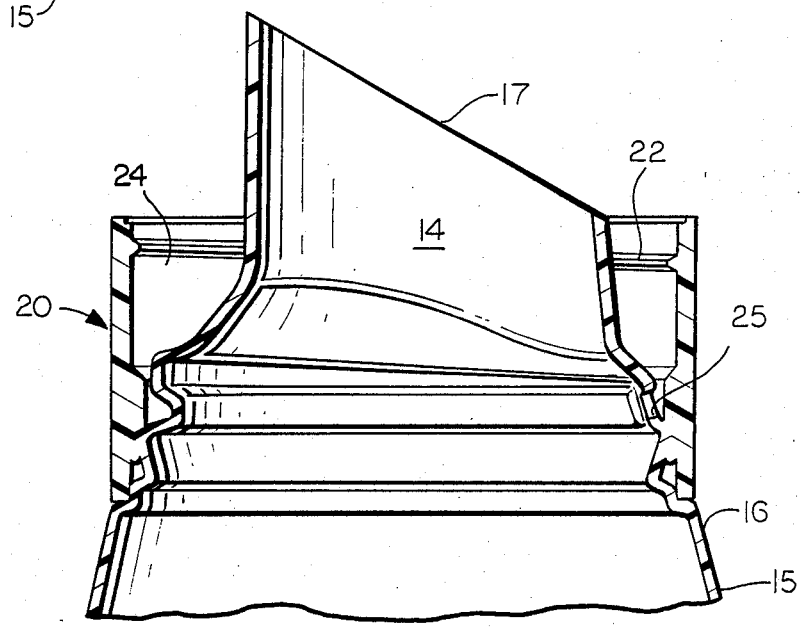
FIG. 6 is a fragmentary sectional view showing the ring member after it has been attached to the pouring spout.

The self draining container 10 includes a generally cup shaped container body 11 having sidewalls 12 and a bottom 13. In the present embodiment, the container body 11 is blow molded from a high density polyethylene. Referring to FIGS. 3, 5 and 6, an integral blow molded pouring spout 14 is located adjacent the upper end 15 of the container body 11. The upper end of the body 15 and the pouring spout 14 define a generally funnel shaped section 16. As viewed in FIG. 6, the funnel shaped section 16 has a reducing diameter as it moves upwardly from the upper end 15 of the body 11 terminating in the angular upper end 17 of the pouring spout 14. The pouring spout 14 has a reduced diameter at its upper end.

Referring to FIGS. 5 and 6, in the present embodiment, a separable ring member 20 is attached to the pouring spout 14. The ring member 20 is an injection molded ring member also constructed of high density polyethylene. The interior of the separable ring member 20 includes a circular layer 21 and internal threads 22. Referring to FIG. 5, the blow molded pouring spout 14 includes a plurality of annular ridges 23 which mate with the circular layer 21 and the interior of the ring member 20. As shown in FIG. 6, the ring member 20 is attached by spin-welding to the pouring spout 14. However, the ring member 20 may be attached to the pouring spout 14 by other methods including threading, adhesion and sonic welding.

The ring member 20 and the pouring spout 14 define a flow back chamber 24. The chamber 24 receives container contents which, for example, spill along the exterior of the pouring spout 14. A drain back opening 25 is defined by the pouring spout 14 and provides a path of communication between the flow back chamber 24 and the interior of the container body 11. A cap 26 having a lower skirt 27, which defines mating threads 28, is positioned over the pouring spout 14. The mating threads 28 engaging the ring member threads 22. It is understood that many styles of caps and threading devices may be utilized and still fall within the scope of the present invention.

It has been found in use that because of the funnel shaped section 16 defined by the upper end 15 of the container body 11 and the integral pouring spout 14 that when the container 10 is inverted almost the entire contents of the container may be removed.

Furthermore, because the container body 11 and the pouring spout 14 are integrally blow molded, there only remains the separable ring member 20 to attach. Because the ring member is circular, the spout orientation problem found in many prior art self draining container assemblies does not occur.

When making a self draining container 10, according to the present invention, the container body 11 and its integral pouring spout 14 are blow molded. The body 11 and the spout 14 define the generally funnel shaped section 16. Next, the pouring spout 14 is cut to form the slanted opening or angular upper end 17. Either before or after the cutting of the pouring spout end 14, the drain back opening 25 is cut in the pouring spout 14 or in the upper end of the body 15 to define a path from the flow back chamber 24 into the container body 11.

Next, the separable plastic ring 20 is attached in surrounding relationship to the pouring spout 14 adjacent the upper end 15 of the container body 11.

Lastly, the cap 26 is mounted over the pouring spout 14.

Many revisions and changes may be made to the various elements of the preferred embodiment of the self draining container described above without departing from the scope of the following claims.

I claim:

1. A self-draining plastic container comprising:
   (a) a bottle having a blow molded body portion for containing liquids, an integrally blow molded funnel portion formed in situ with and extending generally upwardly from said body portion, said funnel portion including a first wall portion having a circular cross-sectional configuration of predetermined diameter extending upwardly from the upper end of the body portion to a radially inwardly extending ledge, a second wall portion extending upwardly and flaring outwardly from the inner portion of said ledge, the diameter of said second wall portion at its upper end being no greater than said predetermined diameter, and an integrally blow molded spout formed in situ with and extending upwardly from said funnel portion, said bottle including the body, funnel and spout formed solely by blow molding followed by cutting excess plastic; and,
   (b) a separately molded ring member engaged to said bottle, said ring member having a circular cross-sectional configuration and having
      (i) a lower portion, the inner surface of which is substantially the same size as said predetermined diameter and positioned adjacent to said first wall portion,
      (ii) an intermediate portion of reduced diameter sealingly engaged with said second wall portion at its upper end, and
      (iii) an upper portion encircling the spout in spaced relationship thereto and cooperating therewith to form a flowback chamber for capturing liquid draining down the spout following pouring of liquid through the spout, and
   (c) aperture means for directing liquid from said flowback chamber to the body portion.

2. A self draining container comprising a blow molded plastic bottle having a body and an integrally blow molded pouring spout formed in situ with and extending upwardly from the upper end of said body, said spout having a reduced cross-sectional size from that of said body, said pouring spout and said body defining a generally funnel shaped section, whereby essentially all of the contents of said body may be removed through said pouring spout when said body is inverted, a separately molded plastic ring member having a circular cross-sectional configuration and closure retention means on its inner surface encircling said pouring spout in spaced relationship thereto and sealing means for attaching said ring member to said funnel shaped section in liquid tight relationship, said pouring spout, said funnel shaped section and said ring member cooperating to define a flow back chamber for capturing liquid draining down the outside surface of said spout following pouring of liquid through the spout, and a flow back opening extending between said flow back chamber and said body for directing liquid from said flow back chamber to said body.

3. A self draining container comprising a blow molded plastic bottle having a body and an integrally blow molded pouring spout formed in situ with and extending upwardly from the upper end of said body, said spout having a reduced cross-sectional size from that of said body, said pouring spout and said body defining a generally funnel shaped section, whereby essentially all of the contents of said body may be removed through said pouring spout when said body is inverted, a separately molded plastic ring member having a circular cross-sectional configuration encircling said pouring spout in spaced relationship thereto and being sealingly attached adjacent such upper end of said body, said pouring spout and said ring member cooperating to define a flow back chamber, a flow back opening extending between said flow back chamber and said body and a separable plastic cap mounted to said plastic ring member over said pouring spout.

4. A self-draining container, according to claim 3, wherein said funnel shaped section defines a plurality of annular ridges between said body and the outlet of said pouring spout, said plastic ring member being sealingly attached to one of said annular ridges.

5. A self-draining container according to claim 3, wherein the upper portion of said plastic ring member is provided with an internal thread and the plastic cap is provided with an exterior thread for engagement with said plastic ring member internal thread.

6. A self draining container comprising in combination:
   (a) a blow molded plastic bottle having a body portion, an integrally formed blow molded spout extending upwardly therefrom and an integrally formed blow molded funnel shaped section between said body portion and said spout, said funnel shaped section having at least one portion which has a circular cross-sectional configuration with a predetermined diameter, said bottle including the body portion, funnel shaped section and pouring spout formed in one piece solely by blow molding followed by cutting excess plastic, and
   (b) a separately molded plastic ring member having inner and outer surfaces, said inner surface having a circular cross-sectional configuration, the diameter of said inner surface in at least one area being substantially the same as said predetermined diameter, sealing means for attaching in liquid tight relationship said plastic ring at said one area to the portion of said funnel shaped section having said predetermined diameter, the portion of said plastic ring member above said sealing means encircling said pouring spout in spaced relationship and cooperating therewith to define a flow back chamber, and
   (c) a flow back openinge extending between said flow back chamber and said body.

7. A self draining container as defined in claim 6, wherein the ring member is provided with an internal thread positioned above said sealing means.

8. A self draining container as defined in claim 7 wherein the inner surface of said ring member has a diameter at the location of said internal thread which is larger than said predetermined diameter.

9. A self draining container as defined in claims 7 or 8 further including a plastic cap having a skirt with an external thread configured for engagement with said internal thread.

* * * * *